April 24, 1956
H. F. FISCHER
2,742,656
AUTOMATIC STOCK LOADER FOR SINGLE
SPINDLE AUTOMATIC SCREW MACHINES
Filed Feb. 16, 1953
3 Sheets-Sheet 3
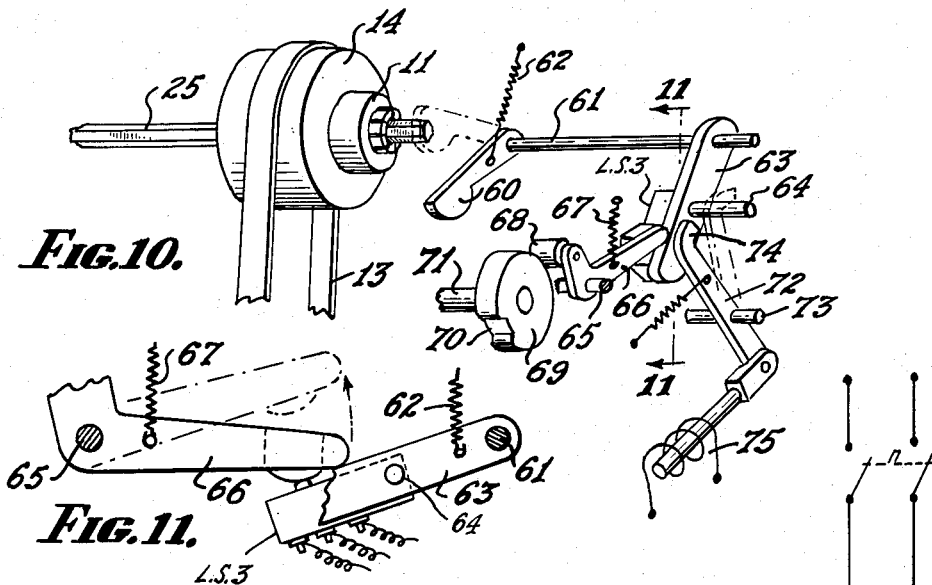
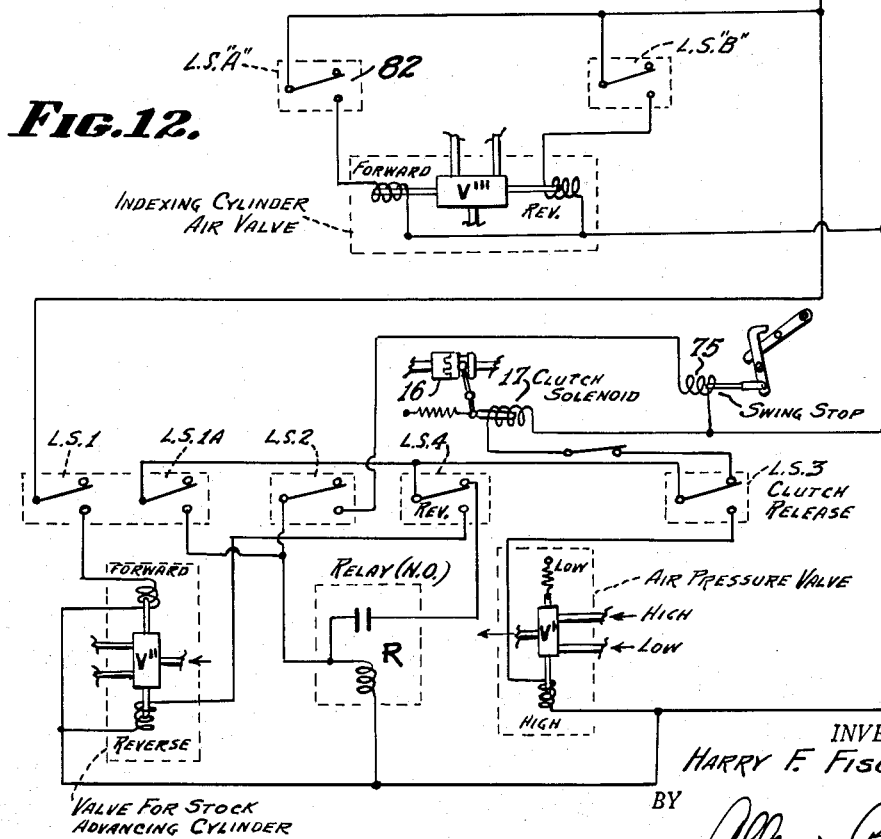
INVENTOR.
HARRY F. FISCHER,
BY
ATTORNEYS.

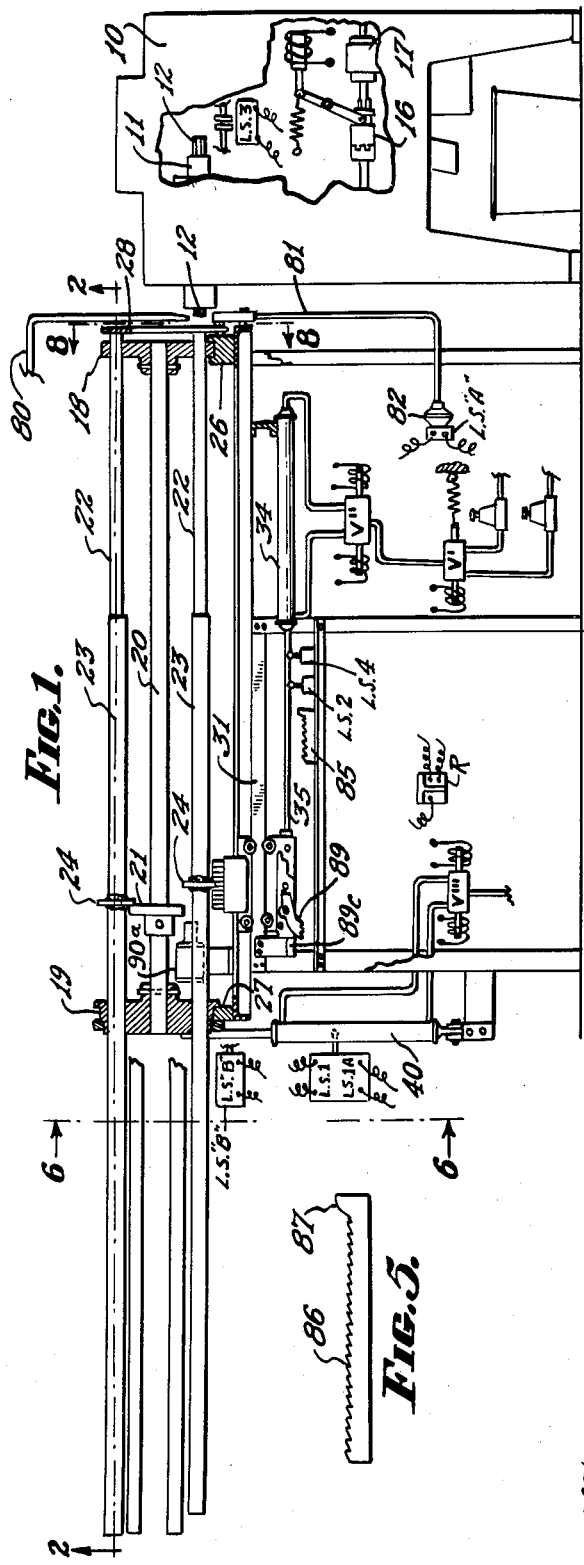

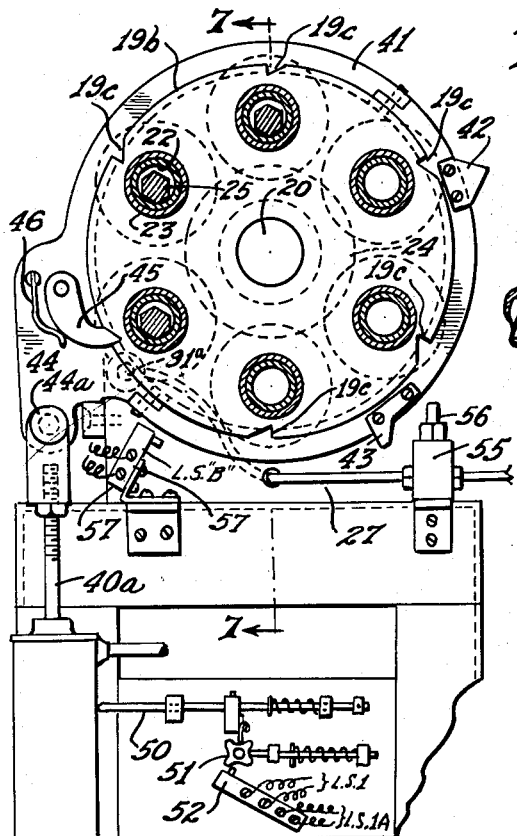
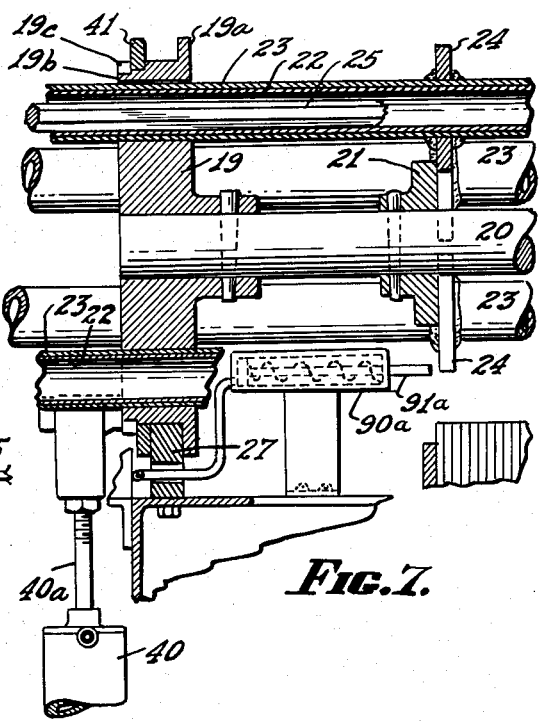
FIG.7.
FIG.6.
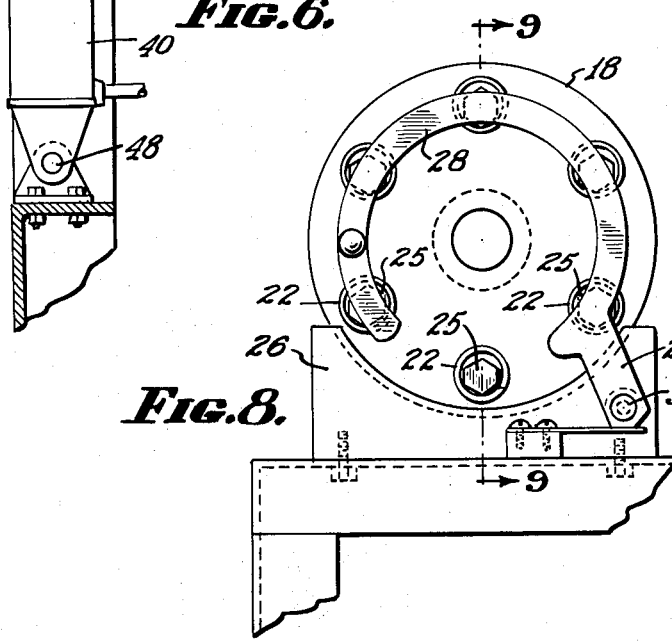
FIG.8.
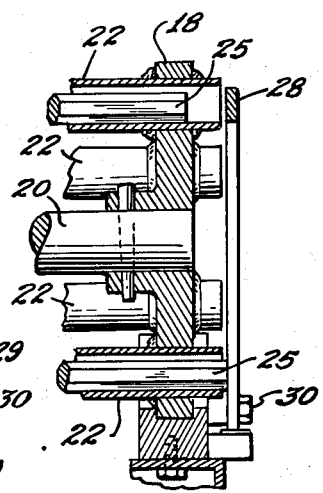
FIG.9.
INVENTOR.
HARRY F. FISCHER,
BY
Allen & Allen
ATTORNEYS.

ent Office 2,742,656
Patented Apr. 24, 1956

2,742,656
AUTOMATIC STOCK LOADER FOR SINGLE SPINDLE AUTOMATIC SCREW MACHINES

Harry F. Fischer, Cincinnati, Ohio

Application February 16, 1953, Serial No. 336,941

7 Claims. (Cl. 10—162)

This invention relates to an automatic stock loader for single spindle automatic screw machines. In an automatic screw machine a piece of bar stock which may be round, hexagonal, square, or of other configuration, is gripped in a collet and rotated while a series of machining operations are carried out concurrently or successively. When all the necessary machining operations have been completed, the completed piece is cut off, thereupon the stock is advanced in the spindle by means of a conventional friction feed shell to present a fresh piece of stock for the same series of operations. When the entire piece of stock has been used up, a new bar of stock must be inserted in the spindle. The replacement of a bar of stock in the spindle is a time consuming operation and with modern automatic screw machines it often has to be performed every five minutes or so because on some operations an automatic screw machine will use up an entire piece of bar stock in five minutes.

With the foregoing considerations in mind, it is an object of the present invention to provide an automatic stock feeder for a single spindle automatic screw machine as outlined above, which feeder will present a fresh bar of stock immediately behind the trailing end of a bar which is about to be used up and which will feed the new bar into position as the old piece is used up with substantially no loss of time.

It is another object of the invention to provide a stock reel which may have any desired number of stock feeding carriers into which bars of stock may be loaded at any convenient time. Thus, an operator of an automatic screw machine, having loaded the stock reel, for example, with six bars, may leave the machine for fifteen or twenty minutes and upon his return may refill the empty elements of the reel with new bars without interrupting the operation of the machine. In this way an operator's constant attendance at a machine is avoided.

It is another object of the invention to provide an automatic stock reel wherein the fresh bar of stock follows along behind the trailing end of a bar which is about to be used up so that the old bar may be used up practically to the end and whereby stock waste is considerably reduced.

Still another object associated with the foregoing object involves automatic mechanism which operates with such a speed that the entire operation of ejecting the scrap end of an old bar and the replacement with a new bar occupies perhaps one-tenth of a second instead of several minutes, if the replacement is made by hand or perhaps a half minute or so if it is done automatically by mechanism heretofore provided for the purpose.

Still another object of the invention is to provide an automatic stock loader as outlined above which will operate with equal certainty on round stock, hexagonal stock, square stock or irregularly shaped stock so that the particular shape of the stock has nothing to do with the manner in which the stock is handled.

Still another object of the invention is to provide a device which requires little or no adjustment by the operator when setting up a new or different job.

These and other objects of the invention which will be pointed out in greater detail hereinafter or which will become apparent to one skilled in the art upon reading the specification, are accomplished by that certain construction and arrangement of parts of which I shall now disclose an exemplary embodiment.

Reference is made to the drawings forming a part hereof and in which:

Figure 1 is a semi-diagrammatic front elevational view of an automatic stock loader with parts in section.

Figure 2 is a longitudinal cross-sectional view through one of the feed tubes taken on the line 2—2 of Figure 1.

Figure 3 is an enlarged elevational view of the feeding assembly.

Figure 4 is a fragmentary cross-sectional view taken on the line 4—4 of Figure 3.

Figure 5 is an enlarged detailed view of a ratchet and cam shown in Figure 1.

Figure 6 is a cross-sectional view as seen from the rear end of the machine on the line 6—6 of Figure 1 on an enlarged scale.

Figure 7 is a fragmentary cross-sectional view taken on the line 7—7 of Figure 6.

Figure 8 is an elevational view as seen from the front end of the machine along the line 8—8 of Figure 1.

Figure 9 is a fragmentary cross-sectional view taken on the line 9—9 of Figure 8.

Figure 10 is a diagrammatic perspective view of the spindle and the swing stop mechanism.

Figure 11 is a detailed view in elevation as seen from the line 11—11 of Figure 10, and Figure 12 is a general wiring diagram of the machine.

Briefly in the practice of my invention, I provide a reel which may comprise any desired number (in the figures there are six) of stock feeding tubes which extend between two spiders which are rotatably mounted in saddles. The reel is arranged to be indexed one-sixth of a revolution at a time so as to bring the six tubes in succession into alignment with the screw machine spindle.

Associated with each of the stock carrying tubes is an outer telescoping tube closed at its outer end; and feeding movement of the stock is accomplished by movement of the outer tube transmitted by the closed end of the outer tube to the end of the stock resting in the inner tube.

A feeler is provided to sense when one bar of stock is about to be used up and the feeler starts an operative cycle which involves indexing the stock reel to bring a tube containing a fresh bar of stock into alignment with the spindle and to feed the new bar up against a stop and then to feed the new bar of stock into the spindle until it abuts the end of the old bar. The new bar is then fed along behind the old bar by air pressure until the old bar is used up, at which point increased pressure is applied to the new bar to eject the stub end of the old bar and position the new bar for further operation.

Referring now in greater detail to the drawings, I have shown in Figure 1 diagrammatically at 10 an automatic screw machine of the single spindle type. The spindle is indicated at 11 and an old bar of stock being operated upon at 12. The spindle is driven by conventional means. A cam shaft clutch is indicated at 16 and the solenoid for actuating the same at 17.

The stock reel spiders are indicated respectively at 18 and 19. The spiders 18 and 19 are connected by a central or axial bar or shaft 20 to which both of the spiders are keyed as indicated. The bar 20 carries a collar 21, which limits the leftward movement of the members 23 by abutment of the collars 24, to be described hereinafter, against the collar 21.

Secured to the spider 18 are a plurality of inner tubes or stock carriers 22. In the particular embodiment illustrated, there are six such tubes 22 spaced symmetrically about the axis 20 and at equal distances from the center. The tubes 22 are open at both ends as best seen in Figure 2 and extend through the spider 19. Telescoped over the tubes 22 are a like number of tubes 23 which are closed at their outer ends as indicated at 24a. Secured to each of the tubes 23, as by welding, is a collar 24. In Figure 2, a fresh bar of stock 25 is shown in position and it will be clear that the bar of stock 25 may be fed toward the right by moving the collar 24a to the right, whereupon the closed end 24a of the tube 23 will push on the trailing end of the bar 25 and feed it into the machine. It will be understood that the tubes 23 are freely slidable in suitable openings in the spider 19 equally and symmetrically distributed and at equal distances from the axis 20 and of course aligned with the openings in the spider 18.

The spiders 18 and 19 are rotatably mounted and ride on saddles 26 and 27 which are mounted on the machine frame. Mounted on the saddle 26, as best seen in Figure 8, is a stop member 28 which is slightly less than a complete circumference of a circle and which is provided with an arm 29 by means of which it is pivotally mounted at 30 to the saddle 26. It will be observed in Figure 8 that the stop bar 28 extends over all of the tubes 22 except that one, at the bottom, which is in alignment with the machine spindle. By virtue of the pivoted mounting, the entire stop plate 28 may be swung out of the way when it is desired to load fresh stock into any of the carriers which are covered by the member 28.

The tubes 23 are moved toward the right in Figures 1 and 2 by means of a mechanism acting upon the collars 24 mentioned above. This mechanism can be seen in Figure 1 and is shown in more detail in Figures 3 and 4. Mounted on the machine frame is a rail 31 and a carriage 32 is provided with the rollers 33 which ride on the upper and lower edges of the rail 31 so that the carriage 32 may ride back and forth along this rail. Movement of the carriage is produced by a piston in the cylinder 34, the piston rod 35 of which is connected to the carriage 32. The mechanism for causing the piston in the cylinder 34 to operate will be described hereinafter. The carriage carries certain cams and other devices which will also be described hereinafter.

Mounted on the carriage 32 is a box-like structure 36 having a slot along the top. A series of pins or plungers 37 are mounted in the box 36 having portions extending up through the slot and these pins are spring-urged upwardly by means of springs 38, as best seen in Figure 4. Thus, the various pins or plungers 37 may be individually depressed. The box 36 and the plungers 37 are so disposed that when the collar 24 on that tube 23 which is in alignment with the spindle 11 comes into the position shown in Figure 1, the collar 24 will depress one or more of the pins 37, as best seen in Figure 3. Then when the carriage 32 is moved along the rail 31, the collar 24 and tube 23 will be carried along with it by virtue of the connection between the pins or plungers 37 and the collar 24.

The purpose of this construction is to insure that the front end of the stock is properly related to the various cams and limit switches which govern the operation of the device. By means of the mechanism which will be described hereinafter, before an indexing operation starts, that collar of the tube 23 which is about to move into position in alignment with the spindle is engaged by a plunger to advance the tube 23 and the bar of fresh stock therein to cause the end of the fresh stock to abut the above described stop member 28. With the bar of fresh stock abutting the stop member 28, the indexing operation proceeds and it will be seen that the collar 24 may engage anywhere along the series of plungers or pins 37 and make an operative connection. When the operative connection has been established, it will be clear that a fixed relationship has been established between the leading end of the bar of fresh stock and the carriage 32 and of course with the various limit switches associated therewith and which will be described hereinafter. The advantage of this construction is that it is not necessary that all the bars of fresh stock be of exactly the same length. There may be a variation in length of the stock of as much as four or five inches without requiring any special adjustment of the machine. It is very easy to buy commercial bar stock with a tolerance of length of say four inches.

The mechanism for producing indexing of the stock reel will next be described with special reference to Figures 6 and 7. This indexing movement is brought about by a piston operating in an air cylinder 40 which may be seen in Figures 1, 6 and 7. As heretofore described, the spider 19 rides in a U-shaped saddle 27. The spider 19 has an inner flange 19a which bears against the inner face of the saddle and serves to maintain the reel in position. Mounted in a groove in the hub of the spider 19 is a ring 41 and the hub of the spider extends beyond the ring 41 as at 19b and is provided with the notches 19c. The ring 41 carries a cam 42 and a cam 43 which will be described hereinafter. The ring 41 has a lateral extension 44 upon which is pivotally mounted a pawl 45, which pawl 45 is urged into operative position by a spring 46. The piston rod 40a of the cylinder 40 is pivotally connected to the extension 44 as at 44a.

When the piston in the cylinder 40 moves upwardly, it will be clear that the ring 41 is rotated in its groove on the spider 19 in a clockwise direction and that the pawl 45 will simply ride over the hub 19b. The pawl 45 will fall into the succeeding notch 19c and upon the down-stroke of the piston, the pawl will continue to engage in the notch 19c and will cause the entire spider 19 to rotate in a counterclockwise direction. It should be noted that the cylinder 40 is pivoted to the frame at 48 because in its operative stroke the cylinder will rock toward the left in Figure 6 and back to the position shown. Thus, each time the cylinder 40, having rocked toward the left about the pivot point 48, rocks back toward the right at the conclusion of the stroke it abuts the plunger 50 which, through a conventional mechanism, as illustrated, produces a quarter revolution of the star wheel 51. During each quarter revolution of the star wheel 51, one of its points contacts the microswitch 52 and actuates it momentarily for a purpose which will be described hereinafter.

Mounted on the frame is an air valve 55 having an actuating element 56 positioned to be engaged and operated by the cam 43 above described. At 57 is a limit switch positioned to be actuated by the cam 43 heretofore described. The operations initiated by these valves and switches will be described hereinafter.

The swing stop mechanism and its associated parts will next be described. Referring particularly to Figures 10 and 11, there is a perspective diagrammatic showing of the spindle and of the machine showing a bar of stock 25 in the spindle. A swing stop is indicated at 60. This swing stop pivots about a rod 61 and is urged to the upper position, shown in broken lines, by means of a spring 62. Also mounted on the rod 61 to swing with the swing stop is a lever 63. The lever 63 has a pin 64 and has mounted thereon a limit switch designated LS3.

Pivoted on a rod 65 is a bell crank lever 66 which operates the limit switch LS3 and which is urged in a counterclockwise direction by means of a spring 67. The bell crank lever 66 also carries the cam follower 68 which operates in association with the cam 69 having a notch 70 and mounted upon the shaft 71. From the foregoing description, it will be clear that the bell crank lever 66 in the position shown in Figure 10 holds the swing stop 60 out of the way of the bar of stock 25. When the cam 69 has rotated to the position in which the roller or follower 68 enters the notch 70, the bell crank lever 66 abruptly moves in a counterclockwise direction and the lever 63, shaft 71 and swing stop 60 move in a clockwise direction under the influence of the spring 62 to position the swing stop 60 in the broken line position of Figure 10. This operation takes place in well known manner every time a completed piece has been cut off and the bar of stock is advanced for a succeeding operation.

When it is necessary to start a fresh bar of stock and eject the stub end of the old bar, means must be provided for holding the swing stop out of the way. This is accomplished by means of a hook lever 72 pivotally mounted upon a rod 73 and having a hook element 74 which can, in the broken line position, engage the pin 64 on the lever 63. When the lever 72 is pivoted in a clockwise direction to the broken line position shown, the hook 74 engages the pin 64 so that, when the bell crank lever 66 rocks when its follower 68 enters the notch 70 of the cam 69, the lever 63 is prevented from following the bell crank lever 66 and the swing stop is held in the solid line position. Movement of the lever 72 about its pivot 73 is achieved by means of a solenoid indicated generally at 75.

The machine has been described as being provided with the usual clutch 16 operated by a solenoid 17.

It will be noted that air is supplied to the cylinder 34 of Figure 1 through a valve V″ so that the valve V″ causes air to flow into one or the other end of the cylinder to produce a reversal of movement of the piston therein. The valve V″ is supplied with air through a valve V′ which supplies to the valve V″ either high pressure air or low pressure air. The valves V′ and V″ are solenoid operated.

The cylinder 40 is supplied with air through a valve V‴, which is a valve similar to the valve V″, to produce a reversal of movement of the piston in the cylinder and the valve V‴ is also solenoid actuated.

As best seen in Figure 1, a feeler mechanism is provided involving an air line 80 which blows a continuous blast of air across the piece of stock passing through the machine. As long as there is stock in the machine, the air blast is interrupted but when, as seen in Figure 1, the trailing end 12 of a bar of stock which is almost used up clears the line 80, the air blast impinges upon the line 81 which actuates a diaphragm switch indicated generally at 82, and this initiates the cycle of operation. It should also be noted that mounted on the frame of the machine are the limit switches LS2 and LS4 and there is a cam and ratchet structure 85 shown in detail in Figure 5 as having a ratchet portion 86 and a cam element 87. The carriage 32 carries a double cam 88 and a pawl element 89. The pawl element 89 is pivoted at 90 and is limited in its counterclockwise gravitational movement by a pin 91.

Having now described the various elements of the machine, the connections and the operation of the machine will be described with particular reference to the diagram of Figure 12. Let it be assumed that a bar of stock is in the machine and is being operated upon in the conventional manner. The continuous air blast through the line 80 is prevented from hitting the line 81 by the presence of the piece of stock 12 in the path of the blast. When the trailing end of the piece 12 clears the line of the blast through the line 80, the blast impinges upon the line 81 and actuates the diaphragm switch 82 (also indicated in the drawing at LS″A″. From Figure 12, it will be seen that closing of the switch 82 establishes a contact through the forward solenoid of the valve V‴ which is the valve controlling admission of air to the cylinder 40. Thus air is admitted to the solenoid 40 to cause the piston therein to move upwardly as seen in Figure 6 and to rotate the ring 41 in a clockwise direction. At this point it should be noted that the stock reel is not indexing; it is still in a stationary position. As the ring 41 rotates in a clockwise direction, the cam 42 impinges upon the actuator or button 56 of the air valve 55 which admits air to the cylinder 90a (Figures 1 and 7) and causes its piston to move toward the right so that its plunger 91a abuts the collar 24 of the tube 23 which is about to be indexed into alignment with the spindle. In pushing the collar 24 toward the right, it pushes the tube 23 toward the right and thereby the piece of fresh stock 25 contained in the tube, until the fresh piece of stock abuts the stop plate 28 above referred to.

As soon as the fresh bar of stock 25 has been abutted against the stop plate 28, the cam 43 on the ring 41 hits the limit switch LS″B″. As will be clear from the diagram of Figure 12, closing of the switch LS″B″ completes the circuit through the reverse solenoid of the valve V‴ so that the piston and the cylinder 40 are caused to return to their original position. As heretofore described, this return movement produces a rotation in the counterclockwise direction of Figure 6 of the stock reel through the agency of the pawl 45 engaging in one of the notches 19c and thus the tube 23 containing the fresh bar of stock which has been properly aligned with the stop plate 28 is brought into position and aligned with the machine spindle. It will be understood that contact of the switches LSA and LSB is momentary only.

It was heretofore pointed out how, when the air cylinder 40 rocks back to the position of Figure 6 it actuates the star wheel 51 and operates the limit switch 52 which is in effect a double switch and will be hereinafter referred to as LS1 and LS1A. The contact of LS1 and LS1A is momentary. The actuation of LS1 completes a circuit through the forward solenoid of the valve V″ which controls the admission of air to the cylinder 34 to cause the carriage 32 to move toward the right. The operation of LS1A momentarily produces a circuit through the relay R and establishes a holding circuit so that when LS4 operates, later, to reverse cylinder 34, the circuit through LS2 (which will next be established) will be broken.

As the carriage 32 moves to the right, the cam face 88a actuates the limit switch LS2 which establishes a circuit through the solenoid 75 to cause the swing stop to be held out of the way. It should be noted that up to this point low pressure air has been applied to the cylinder 34 (pressure of about five to seven pounds per square inch) which is sufficient to cause the fresh bar 25 to follow up snugly behind the old bar.

Since now the swing stop is being held out of the way, the next time the cam follower 68 engages in the notch 70 of the cam 69, the limit switch LS3 will be actuated. The actuation of the switch LS3 breaks the clutch solenoid circuit to cause the clutch to open and stop the cam shaft of the machine and a circuit is established through the high pressure solenoid of the valve V′ so that the valve is moved over to supply high pressure air to the cylinder 34 (high pressure air is on the order of fifty or seventy-five pounds per square inch). Under the influence of the high pressure air the carriage 32 is moved toward the right under high pressure to force the used up stub end of the stock out of the collet and force the beginning end of the fresh bar 25 into position in the collet. During this movement, as soon as the carriage 32 has advanced to the point where the cam surface 88d actuates the switch LS4, a circuit is established through the reverse solenoid of the valve V″ to produce a reverse movement of the carriage 32. Movement of the switch LS4 to cause reverse movement of the carriage 32 also breaks the circuit through the holding relay R, as described above, thus releasing the swing stop. The releasing of the swing stop restores the switch LS3 which permits V′ to return to low pressure position. It also reenergizes the clutch solenoid 17 which actuates the clutch 16 to restart the cam shaft. A safety feature is provided in that if there is an obstruction in the path of the swing stop (including an incompletely ejected old bar) the swing stop will hit the obstruction and therefore will not be completely released and thus LS3 will not be restored and the cam shaft will not be restarted.

The function of the pawl 89 and ratchet 85 is simply to prevent the new bar from being pushed back into its tube during reverse movement of the friction feed shell of the screw machine. The cam element 87 (Fig. 5) on the ratchet 85 is simply for the purpose of rocking the pawl 89 to the point where its spring plunger 89a passes the pin 89b so as to hold the pawl out of the way of the ratchet 85 during the return movement of the carriage 32. At the end of the return movement the pawl 89 strikes an abutment 89c which returns the pawl to its original position.

From the foregoing description, it is believed that the cycle of operation of the machine will be clear.

It will be understood that as a result of the mechanism herein described, it is possible to utilize more completely a whole bar of stock so that more pieces can be made from a given bar of stock than by any conventional machine. It will also be clear that the cycle of operations involving the ejection of the old bar and positioning of the new bar takes place so rapidly that it cannot be followed by the human eye. It is estimated that the entire operation is completed in perhaps 1/10 of a second. Thus the down time of the machine is materially reduced and this represents an increase in the productive capacity of the machine. It will also be understood that by virtue of the particular feeding arrangement disclosed the shape of the bar is not material and hexagonal stock can be fed just as efficiently as round stock. It will be understood that numerous modifications may be made without departing from the spirit of the invention and I therefore do not intend to limit myself except as set forth in the claims which follow.

Having now fully described my invention, what I claim as new and desire to secure by Letters Patent is:

1. An automatic stock loader for automatic bar machines arranged to operate on a bar which is fed along on its axis, comprising a frame, a plurality of feed tubes disposed in parallel relation to each other and mounted in symmetrical arrangement on an indexable carrier on said frame, said carrier being disposed in relation to said axis so that each of said tubes, in turn, may be aligned therewith, each of said feed tubes comprising an inner tube shorter than the length of bar stock to be loaded, and of a diameter to contain a bar of stock, and an outer tube in telescoping relation to said inner tube, said outer tube being closed at its free end and telescopingly movable over its inner tube to advance a bar of stock therein by contact of the closed end of said outer tube with the trailing end of said bar of stock, means for indexing said carrier in timed relation to the operation of said machine, an aligning stop for the leading end of a bar of stock in that tube which will next be indexed into alignment with said axis, an abutment on each of said outer tubes, means on the frame engageable with the abutment on said last named tube to thrust the bar of sock therein against said aligning stop, a carriage, means on said carriage engageable with said abutment when each tube is indexed into alignment with said axis, and separate means for producing feeding movement of said carriage.

2. A device according to claim 1 wherein said engageable means comprises a plurality of closely spaced, individually depressible plungers disposed transversely of said spindle and in a row parallel to said spindle, individual spring means urging the several plungers to extended position, one or two of said plungers being depressed by said abutment when a tube is indexed into feeding position, the extent of said plungers being equivalent to the allowable variation in the length of bar stock being fed, whereby a definite relationship is established between the leading end of the bar of stock and the said engageable means irrespective of allowable variations in the length of the particular bar of stock.

3. An automatic stock loader for automatic bar machines arranged to operate on a bar which is fed along on its axis, said loader comprising at least two spaced, parallel and axially aligned spiders having rotatable mountings, a plurality of inner tubes secured to one of said spiders in symmetrical squirrel-cage arrangement and passing through apertures in the other spider, a like number of outer tubes passing freely through the apertures in said other spider and telescoped over said inner tubes, said outer tubes being closed at their free ends and having feeding abutments thereon between said spiders, said loader being indexable to a number of positions equal to the number of said tubes, one of said positions being in axial alignment with said axis, and means for indexing said loader.

4. A device according to claim 3, wherein one of said spiders carries a ring concentric thereto and rotatable with respect thereto, said spider having a series of notches equal in number to said tubes and said ring carrying a pawl, and means for oscillating said ring to produce indexing movement of said spider and thus of said loader.

5. In an automatic stock loader for automatic screw machines having a spindle and a stock feeding mechanism for a bar being machined, means for advancing a new bar of stock into said spindle behind the trailing end of said bar being machined, comprising a carriage, means on said carriage for transmitting motion of said carriage to said new bar, an air cylinder having a piston, said piston having a rod connected to said carriage, valve means for supplying air selectively to one end or the other of said cylinder to produce feeding or retracting movement of said carriage, and other valve means for supplying to said first named valve means selectively low pressure air for maintaining contact between the leading end of said new bar and the trailing end of said bar being machined, or high pressure air for advancing said new bar through said feeding mechanism to machining position, and control means for said first named valve actuated by said carriage in its movement to reverse said first named valve at the end of the feeding stroke and again reverse it at the end of the retracting stroke, and means on said carriage to shift said other valve means from the low pressure position to the high pressure position adjacent the end of the feeding stroke, and back to low pressure position just before the commencement of the retracting stroke.

6. In an automatic loader for automatic screw machines having a reciprocable friction feed shell, a feed carriage having pneumatic means for advancing a bar of stock into said feed shell, said carriage being reciprocable on a frame and having a pawl, said frame carrying a ratchet engageable by said pawl to prevent rearward movement of said bar of stock and said carriage upon rearward movement of said feed shell.

7. A structure according to claim 6, wherein a first abutment for said pawl is provided on the frame adjacent the end of the feeding stroke of said carriage, to move said pawl to inoperative position, yieldable means associated with said pawl to hold it in inoperative position, and a second abutment means for said pawl is provided on the frame adjacent the end of the return stroke of said carriage to move said pawl back to operative position.

References Cited in the file of this patent

UNITED STATES PATENTS

| | | |
|---|---|---|
| 782,243 | Hanson | Feb. 14, 1905 |
| 945,454 | Hanson | Jan. 4, 1910 |
| 2,059,710 | Rupple | Nov. 3, 1936 |
| 2,063,339 | Probach | Dec. 8, 1936 |
| 2,548,786 | Harney | Apr. 10, 1951 |
| 2,595,522 | Harney | May 6, 1952 |
| 2,646,087 | Jobert | July 21, 1953 |